United States Patent [19]

McMahan et al.

[11] Patent Number: 4,731,707
[45] Date of Patent: Mar. 15, 1988

[54] VEHICLE HEADLAMP ASSEMBLY

[75] Inventors: David R. McMahan; Harry S. Murphy, Jr.; John D. Geddie, all of Anderson, Ind.

[73] Assignee: General Motors Corporation, Detroit, Mich.

[21] Appl. No.: 45,300

[22] Filed: May 4, 1987

[51] Int. Cl.[4] .......................... B60Q 1/06; F16C 11/00
[52] U.S. Cl. ......................................... 362/66; 362/61; 362/306; 403/77
[58] Field of Search ............... 362/63, 66, 69, 65, 362/70, 372, 80, 226, 61, 306; 74/417, 2 J, 606 R; 403/77

[56] References Cited

U.S. PATENT DOCUMENTS

| 2,225,980 | 12/1940 | Casson | 362/66 |
| 2,410,365 | 10/1946 | Sauar | 362/66 |
| 3,050,621 | 8/1962 | Spencer | 362/61 |
| 4,345,307 | 8/1982 | Mayer et al. | 362/306 |
| 4,524,407 | 6/1985 | Igura | 362/66 |
| 4,574,334 | 3/1986 | Igura | 362/66 |
| 4,578,740 | 3/1986 | Krizmank | 362/66 |

Primary Examiner—Raymond A. Nelli
Attorney, Agent, or Firm—Edward J. Biskup

[57] ABSTRACT

A vehicle headlamp assembly includes a box-like support frame enclosing a lamp body mounted adjustably as by connectors which are connected to the support frame through resilient means to cushion any shock that the lamp body may experience during the travel of the vehicle along a roadway.

6 Claims, 9 Drawing Figures

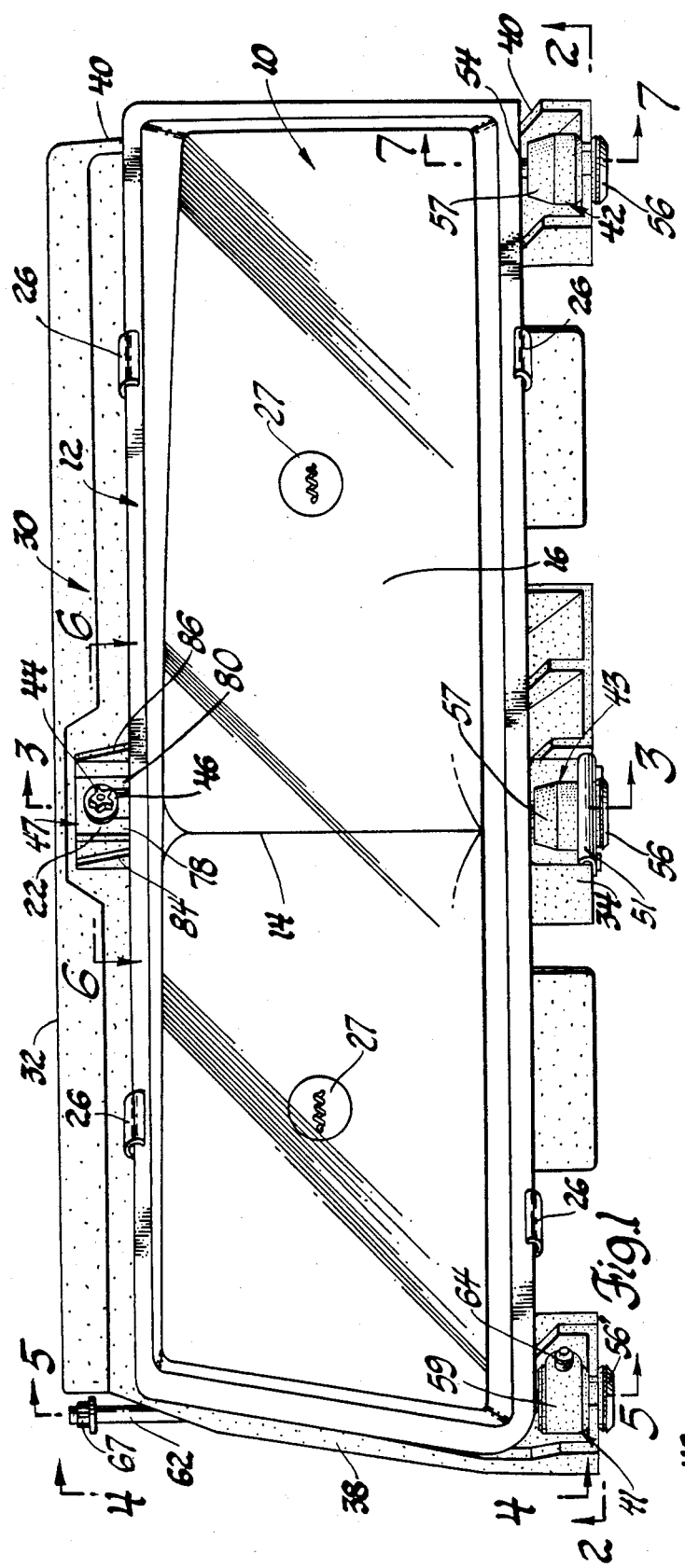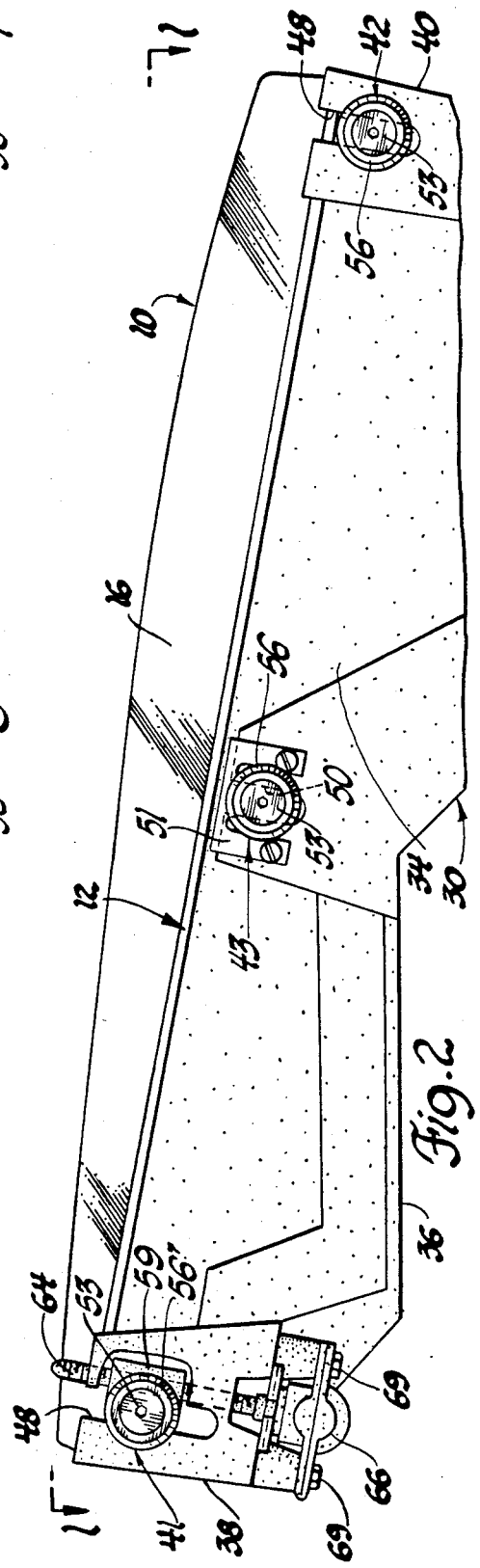

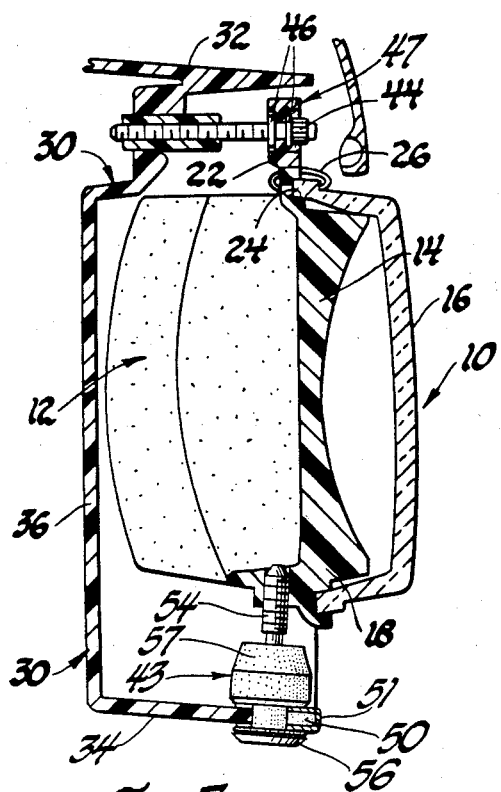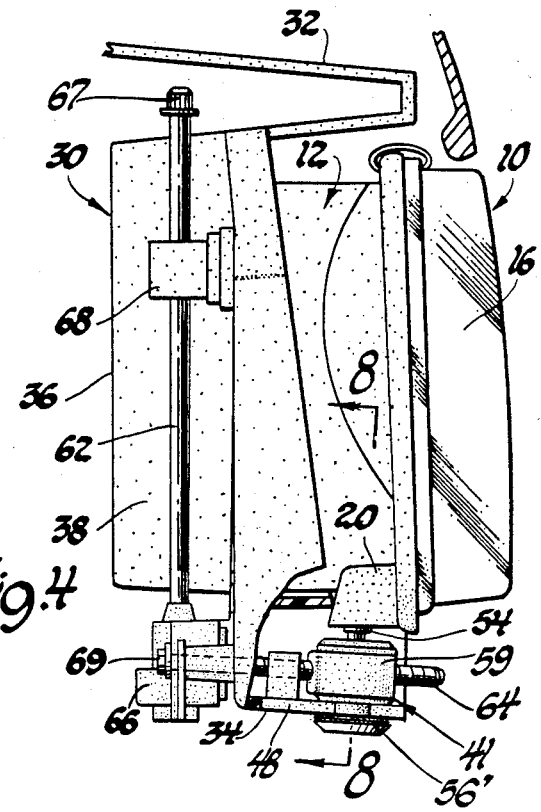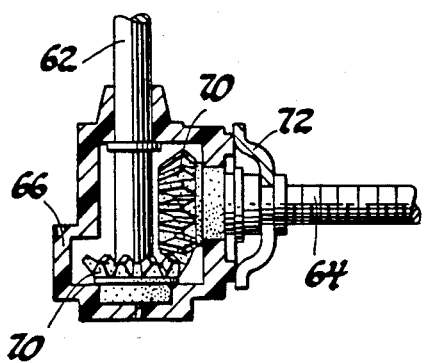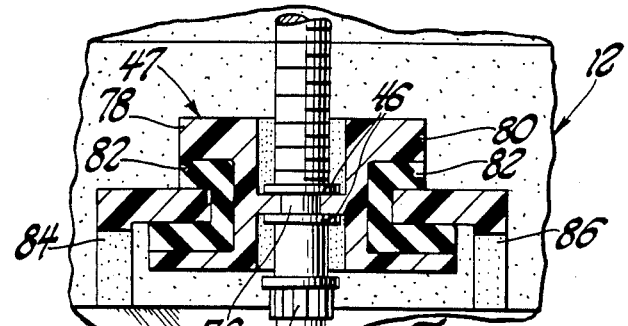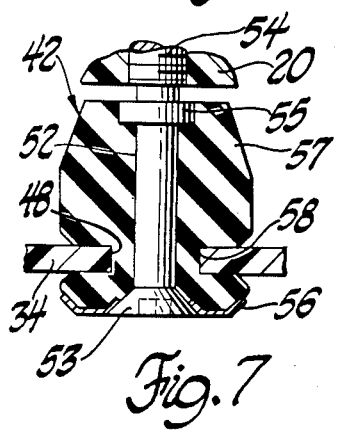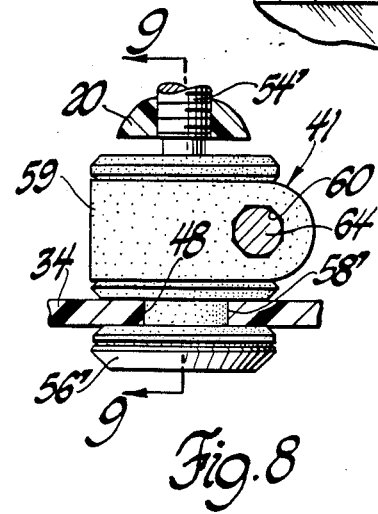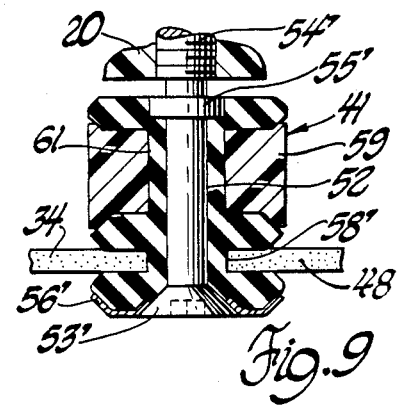

VEHICLE HEADLAMP ASSEMBLY

This invention relates to vehicle headlamps and more particularly to aim adjustable headlamps normally incorporated in the front end of a motor vehicle.

Copending U.S. patent application Ser. No. 824,197 filed on Jan. 30, 1986 in the name of McMahan et al and assigned to the Assignee of this invention, discloses a headlamp assembly incorporating an improved adjustment arrangement in which manipulations of aiming adjusters may take place at any location about th margin of the lamp from the front, side or rear at the selection of the designer to satisfy whatever styling or structural concerns which may dominate. One feature of the headlamp assembly shown in the aforementioned application is the use of support shoes at the opposite ends of the lamp body for connecting the latter to the support frame and allowing selective pivotal movement of the lamp body about a horizontal axis and a vertical axis.

The present invention concerns a motor vehicle headlamp construction that is similar to that shown in the above application but differs therefrom in that the lamp is mounted through a resilient means to the support frame so as to cushion the lamp from shock as well as to prevent grit and mud from gaining access between the support frame and the support shoes. More specifically, the vehicle headlamp assembly made according to the present invention includes a support frame which is adapted to be fixedly secured to the front end of the motor vehicle. The lamp body is located within the support frame for selective adjustment movement about a vertical axis and a horizontal axis and a first axiallly adjustable connector is secured to the lamp body and located along the vertical axis between the lamp body and the support frame while a second axially adjustable connector is secured to the lamp body and located along the horizontal axis about which the lamp body is movable. In addition, a third non-adjustable connector is provided which is secured to the lamp body and located at the intersection of the vertical axis and the horizontal axis about which the headlamp is movable. Finally, the first, second and third connectors are each provided with resilient means interposed between the lamp body and the support frame so as to cushion the headlamp from shock while the vehicle is being driven along a roadway.

The objects of the present invention are to provide a new and improved vehicle headlamp assembly in which the headlamp is supported within a support frame by resilient connectors which serve to cushion the headlamp from shock; to provide a new and improved headlamp assembly in which the headlamp is supported within a housing by at least three connectors each of which incorporates an elastomeric part for isolating the headlamp from undesirable movement created by an irregular roadway along which the vehicle is traveling, to provide a new and improved vehicle headlamp assembly in which the headlamp is supported within a support frame by at least three resilient connectors, two of which control selective adjustable movement of the headlamp about a vertical axis and a horizontal axis and a third of which serves as a universal pivot; and to provide a new and improved headlamp assembly having a headlamp supported in a housing by resilient shoes which provide a sealing effect to prevent mud and grit from getting in between the shoes and the housing.

These and other objects, features and advantages of the invention will be apparent from the following specification and from the drawings wherein:

FIG. 1 is a front elevational view of a vehicle headlamp assembly having a headlamp supported within a housing according to the present invention;

FIG. 2 is a bottom view, partially broken away, taken along the plane indicated 2—2 in FIG. 1;

FIG. 3 is a sectional view taken along the plane indicated 3—3 in FIG. 1;

FIG. 4 is an end view taken along the plane indicated 4—4 in FIG. 1;

FIG. 5 is an enlarged sectional view taken along the plane indicated 5—5 in FIG. 1;

FIG. 6 is an enlarged sectional view taken along the plane indicated 6—6 in FIG. 1;

FIG. 7 is an enlarged sectional view of one of the support shoes taken along the plane 7—7 in FIG. 1;

FIG. 8 is an enlarged frontal of another form of support shoe view taken on line 8—8 of FIG. 4; and FIG. 9 is a sectional view taken on line 9—9 of FIG. 8.

Referring now to the drawings and specifically FIGS. 1–3, a so-called styled headlamp assembly for upscale automotive vehicle bodies is shown made according to the invention. Such assembly includes a headlamp body 10, comprised of an elongated, dish-like, multiple cavity rectangular reflector member 12, the two side-by-side cavities of which are separated by a web or webs 14, and the open front face of which is closed by a glass or like material lens element 16. As viewed best in FIG. 3, the reflector member 12 may be molded of a suitable polymer, particularly to include a variety of thickened portions for provision of mounting details as will be described. Such thickened portions include a region 18 at the lower margin of the reflector member 12 adjacent web 14, and similar such regions 20, FIG. 4, at opposite lateral ends of the reflector member 12. Reverting to FIG. 3, another thickened flange area 22 is provided above the web 14. Suitable grooving or channeling, as at 24, is provided around the entire margin of the open face of the reflector member 12 to receive the flange like margins of the lens element 16. An adhesive and sealant such as butyl may be added at the inner face of the lens flange to prevent the ingress of foreign material and the lens 16 element is fixedly retained on the reflector member 12 by means such as clips 26. Conventional lamp bulbs 27 may be provided, as is well known, in each of the reflector cavities for low beam, high beam or parking lamp illumination selected at the will of the driver.

As also seen in FIGS. 1–3 the lamp includes a box-like support frame, generally designated as 30. This support frame 30 may also be fabicated of a polymer material molded to a shape, such as shown, preferably providing spaced horizontally extending upper and lower walls 32 and 34, respectively, joined by a back wall 36 and by opposite end walls 38 and 40. Support frame 30 is suitably affixed to the front body structure, not shown, of the vehicle body by whatever conventional means desired.

The lamp body 10 is in turn mounted on support frame 30 by a pair of slideable support shoes or connectors 41 and 42, and a stationary support shoe or connector 43, as seen best in detail in FIGS. 3, 4, 7 and 8 as well as by an upper adjustable fastener 44. Fastener 44 is a threaded element having a head suitably tooled for reception of a hand adjusting device, such as a screwdriver, and having a threaded shank screwed into a thickened portion of the back wall 36 of the support frame 30. The head portion of the fastener 44 has spaced shoulders 46 which are caaptured by a retainer member 47 connected to the reflector member 12 in region 22. The fastener 44 and retainer member 47 together serve as a connector with the fastener 44 in the illustrated case, being accessible from the front of the vehicle and normally hidden, for example, by the lower marginal edge of the lip of the vehicle hood.

Referring to FIG. 2 and to FIGS. 6 and 7, the lower wall 34 of frame 30 is slotted at the end regions thereof as at 48 to receive the support shoes 41 and 42. Similarly, midway between the support shoes 41 and 42 the lower wall 34 of the support frame 30 is also slotted as at 50 to receive the support shoe 43 which is restrained from axial movement in the accommodating slot 50 by a clip 51 secured to the support frame 30. Although support shoes 43 cannot move axially along the slot 50, it does serve as a universal pivot allowing the headlamp body 10 to be rotatably adjusted about a vertical axis and tilted about a horizontal axis as will be explained hereinafter.

It will be noted that support shoes 42 adn 43 are identical in size and construction, and as best seen in FIG. 7, each support shoe 42 and 43 includes a metal stud 52 the lower end of which is formed with a frusto-conical head 53 and the upper end of which is integral with a threaded shank 54. Spaced below the threaded shank 54 is a collar 55 integrally formed with the stud 52, and resting on the head 53 is a metal grommet 56. Between the collar 55 and the grommet 56, a barrel shaped body 57 of elastomeric material is molded around the stud 52. An annular groove 58 is formed in the body 57 so as to allow each of the support shoes 42 and 43 to be slid into the associated slot formed in the support frame 30. As seen in FIGS. 1 and 3, threaded shanks 54 of the support shoes 42 and 43 are screwed into the thickened regions 20 and 18, respectively, of the reflector member 12.

As seen in FIGS. 8 and 9, the support shoe 41 is similar in construction to the support shoes 42 and 43 and therefore the identical parts of support shoe 41 are identical by corresponding reference numerals but primed. Support shoe 41 differs from support shoes 42 and 43 in that a plastic body member 59 is provided that has a threaded bore 60 formed therein. In this case, the body member 59 is located in an enlarged annular groove formed in the elastomeric body 57' above the annular groove 58'.

It should be apparent from the above description that the lower portion of the reflector member 12 is resiliently supported by the support shoes or connectors 41, 42, and 43, each of which also serves as a pivot. Thus, the lower portion of the studs are located in a horizontal plane of the support frame 30 and together through their centers define an instantaneous axis of rotation for aiming adjustment of the lamp body 10 in vertical planes. Such adjustment is of course effected by manipulated rotation of fastener 44 by a screwdriver or the like. Aiming or adjustment of lamp body 10 in the horizontal planes, on the other hand, about a vertical center axis is effected by manipulation of the shoe 41. The vertical axis for such horizontal adjustment is established by the shouldered head of fastener 44 and the support shoe 43. As earlier mentioned, support shoes 41 adn 42 are slideable within slots 48 of frame 30 to provide for adjustment of the lamp body 10. The slots 48 may, of course, be aligned generally on circular arcs centered on the vertical axis through the stud of support shoe 43.

Adjustment of support shoe 41 is effected by an angularly arranged adjustment apparatus, seen best in FIG. 4. The present exemplary embodiment illustrates one case of a desired orientation for the apparatus, including a pair of orthogonally arranged shafts 62 and 64 which are interconnected in a housing 66. The vertical shaft 62 has a head 67 located adjacent the upper wall 32 of the support frame 30 at the location easily manipulated by a hand screwdriver or the like, and arranged for rotation within a support clip 68 attached to the back wall 36 of the support frame 30. The lower end of shaft 62 extends into the gear housing 66 which is likewise suitably attached to the back wall as by screws 69. As seen best in FIG. 5, the lower end of shaft 62 has mounted thereto one of a pair of bevel gears 70 which are meshed and suitably journaled in circular recesses of the gear housing 66. The other of the bevel gears 70 is mounted at the internal end of the other shaft 64 and the gears are held in meshing engagement by means of a spring clip 72 inserted between a wall of the gear housing and a shoulder of shaft 64. As illustrated, the shaft 64 has the majority of its length threaded, and as seen best in FIG. 7, such threaded length of the shaft is threadably engaged in the threaded bore 60 of the shoe 41.

Thus, a selected rotation by a screwdriver or the like applied to the head 67 of shaft 62 will cause rotation of the lower threaded shaft 64 within its gear housing 66, resulting in a sliding adjustment of the engaged support shoe 41 and its opposite shoe 42 for or aft in their slots 48, so that the headlamp body 10 is adjusted or aimed relative to frame 30 about the vertical axis defined on the shoe 43 and the shouldered head of fastener 44 as hereinbefore described.

It will be noted that as seen in FIGS. 1 and 6, the retainer member 47 associated with the fastener 44 is generally U-shaped having a key-holed shaped opening 74 which receives and retains in a snap-in fashion the cylindrical portion 76 of the fastener 44. The retainer member 47 is formed with a pair of integral and laterally spaced legs 78 and 80 which are U-shaped in extending groove or channel which fixedly accommodates a U-shaped elastomeric element 82 so as to allow the retainer 47 to slide on and be supported by a pair of laterally spaced upstanding arms 84 and 86 integrally formed with the upper portion of the reflector member 12. Thus, the retainer member 47 together with the shoes 41, 42 and 43 serve as connectors which include an elastomeric material located between the lamp body 10 and the support frame 30 for resiliently supporting the lamp body 10 and thereby cushioning the latter from shock. In addition, by properly sizing the annular grooves 58 and 58' of the shoes 41, 42 and 43, a sealing effect is provided within the slots 48 and 50, between the upper and lower surfaces of the associated wall 34 and the areas of the groove 58, 58' contacting such surfaces, as seen in FIGS. 7-9. This sealing effect helps prevent grit or mud from entering this area and possibly causing an abrasive wearing of the surfaces.

Finally, it will be noted that even though the shoe 42 is provided in this vehicle headlamp assembly, it would be possible to eliminate such shoe 42 and still permit proper support and adjustment of the lamp body 10, although if the shoe 42 is removed and due to the overhang of the headlamp at one end, some stability of the headlamp may be sacrificed particularly if the vehicle is subjected to excessive vibratory forces. Also, it will be understood that when the shaft 64 is rotated for adjusting the lamp body 10 about a vertical axis, the shoe 43 and particularly the body 57 together with the stud 52 will rotate about the vertical center axis of the latter. In addition, when the fastener 44 is manually rotated, the shoes 41, 42 and 43 will act as pivots allowing the lamp body to be adjusted in position about the aforementioned horizontal axis as more fully explained in co-pending patent application F-954, in the name of McMahan et al, entitled Headlamp Pivot Assembly, filed concurrently with this application and assigned to the Assignee of this invention.

Various changes in modifications can be made in this constructed without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A vehicle headlamp assembly comprising a support frame adapted to be fixedly secured to the front end of a motor vehicle, a lamp body located within said support frame for selective adjustable movement about a vertical axis and a horizontal axis, a first axially adjustable connector secured to the lamp body and located along the vertical axis between the lamp body and the support frame, a second axially adjustable connector secured to lamp body and located along the horizontal axis, and a third non-adjustable connector secured to the lamp body and located at the intersection of the vertical axis and the horizontal axis, said first, second and third connectors each having resilient means interposed between the lamp body and the support frame so as to cushion the head lamp from shock.

2. A vehicle headlamp assembly according to claim 1, wherein said first axially adjustable connector serves as a pivot and includes a metal stud secured to the lamp body and terminating at its free end with an enlarged head, a grommet located on said head, an elastomeric material molded around said stud and being formed with a pair of vertically spaced annular grooves, a plastic body member located within and enclosing one of said grooves and having a bore formed therein with its longitudinal axis offset from and normal to the longitudinal axis of said stud for receiving a threaded member carried by said support frame, and the other of said grooves adapted to be located within slot formed in said support frame so as to allow a sliding movement of said first axially adjustable connector upon rotation of said threaded member.

3. The headlamp assembly of claim 1 wherein said second axially adjustable connector includes a U-shaped retainer adapted to support the lead of an adjustment screw for rotation about the longitudinal center axis of said screw, said retainer having a pair of laterally spaced legs each formed with a vertical channel, each of said channels having an elastomeric material located therein which provides a tongue and groove connection with the lamp body.

4. The headlamp of claim 1 wherein said third non-adjustable connector serves as a pivot for allowing said lamp body to be selectively rotated about said vertical axis and about said horizontal axis and includes a metal stud secured to the lamp body that terminates with an enlarged head, a grommet located on said head, a barrel-shaped elastomeric body molded around said stud, and an annular groove formed in said elastomeric body for allowing said third non-adjustable connector to be located within a slot formed in said support frame, and clip means for preventing sliding movement but allowing rotative movement of said third non-adjustable connector relative to said support frame when said lamp body is adjusted about said vertical axis.

5. A vehicle headlamp assembly comprising a support frame adapted to be fixedly secured to the front end of a motor vehicle, a lamp body located within said support frame for selective adjustable movement about a vertical axis and a horizontal axis, a first axially adjustable connector secured to the lamp body and located along the vertical axis between the lamp body and the support frame, second and third axially adjustable connectors secured to lamp body and located along the horizontal axis, and a fourth non-adjustable connector secured to the lamp body and located at the intersection of the vertical axis and the horizontal axis, said first, second, third and fourth connectors each having resilient means interposed between the lamp body and the support frame so as to cushion the head lamp from shock, said second and third axially adjustable connectors each including a metal stud secured to the lamp body and terminating at its free end with an enlarged head, a grommet located on said head, an elastimeric body surrounding said stud and being formed with at least one annular groove adapted to cooperate with a slot within said support frame to allow controlled sliding movement of the lamp body relative to the support frame during adjustment of said lamp body about said vertical axis.

6. A vehicle headlamp assembly comprising a support frame adapted to be fixedly secured to the front end of a motor vehicle, a lamp body located within said support frame for selective adjustable movement about a vertical axis and a horizontal axis, a first axially adjustable connector secured to lamp body and located along the horizontal axis, and a third non-adjustable connector secured to the lamp body and located at the intersection of the vertical axis and the horizontal axis, said first, second and third connectors each having resilient means interposed between the lamp body and the support frame so as to cushion the head lamp from shock, one of said axially adjustable connectors including a metal stud secured to the lamp body and terminating at its free end with an enlarged head, a grommet located on said head, an elastomeric body surrounding said stud and being formed with a pair of vertically spaced annular grooves, a plastic body member located within and enclosing one of said grooves and having a bore formed therein in a position offset from and normal to the longitudinal center axis of said stud for receiving a threaded member carried by said support frame, and the other of said grooves adapted to be located within a slot formed in said supprt frame so as to allow sliding movement of said one of said axially adjustable connectors upon rotation of said threaded member.

* * * * *